United States Patent
Yazaki et al.

(10) Patent No.: US 8,997,962 B2
(45) Date of Patent: Apr. 7, 2015

(54) CLUTCH APPARATUS FOR A POWER UNIT AND POWER UNIT INCORPORATING THE SAME

(75) Inventors: Masaya Yazaki, Saitama (JP); Atsushi Kobayashi, Saitama (JP); Akio Senda, Saitama (JP); Seiji Anzai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 572 days.

(21) Appl. No.: 13/007,799

(22) Filed: Jan. 17, 2011

(65) Prior Publication Data
US 2011/0192699 A1    Aug. 11, 2011

(30) Foreign Application Priority Data
Feb. 9, 2010    (JP) .................................. 2010-026110

(51) Int. Cl.
| F16D 13/72 | (2006.01) |
| F16D 13/56 | (2006.01) |
| F16D 13/52 | (2006.01) |
| F16D 13/71 | (2006.01) |
| F16D 13/74 | (2006.01) |

(52) U.S. Cl.
CPC ................ F16D 13/72 (2013.01); F16D 13/52 (2013.01); F16D 13/71 (2013.01); F16D 13/74 (2013.01)

(58) Field of Classification Search
USPC ......... 192/113.5, 70.12, 89.26, 113.34, 113.3
See application file for complete search history.

(56) References Cited

U.S. PATENT DOCUMENTS

| 4,540,077 A | * | 9/1985 | Yamamoto et al. ......... 192/70.12 |
| 2007/0082774 A1 | * | 4/2007 | Tawarada ...................... 474/111 |

FOREIGN PATENT DOCUMENTS

| JP | 10-274256 | 10/1998 |
| JP | 11082537 A | * 3/1999 ............. F16D 13/72 |

* cited by examiner

Primary Examiner — Gene Crawford
Assistant Examiner — Lillian Nguyen
(74) Attorney, Agent, or Firm — Carrier Blackman & Associates, P.C.; Joseph P. Carrier; Anne G. Sabourin

(57) ABSTRACT

A clutch apparatus includes a clutch outer member for supporting friction discs, which are nonrotatable relative to the clutch outer member, and are axially slidable along a clutch axis; a clutch inner member for supporting clutch discs, which are nonrotatable relative to the clutch inner member, and are axially slidable along the clutch axis, and a pressure plate having a deep recess for accommodating a clutch spring engaged with the clutch inner member. The deep recess includes a bottom portion having a spring seat for receiving the clutch spring, and a partially cylindrical shape wall portion having an axis parallel to the clutch axis. The wall portion is oriented towards the clutch axis. The deep recess has a communicating portion formed therein for establishing the communication between the inner and outer surfaces of the wall portion so as to discharge oil towards the friction and clutch discs during operation.

7 Claims, 5 Drawing Sheets

CLUTCH APPARATUS FOR A POWER UNIT AND POWER UNIT INCORPORATING THE SAME

CROSS-REFERENCE TO RELATED APPLICATIONS

The present invention claims priority under 35 USC 119 based on Japanese patent application No. 2010-026110, filed on Feb. 9, 2010. The entire subject matter of this priority document, including specification claims and drawings thereof, is incorporated by reference herein.

BACKGROUND OF THE INVENTION

1. Field of the Invention

The present invention relates to a clutch apparatus for a power unit having an internal combustion engine, and to a power unit including the clutch apparatus. More particularly, the present invention relates to a clutch apparatus having a clutch outer member, a clutch inner member, and a pressure plate with a communicating portion formed therein to discharge oil from a recessed portion of the pressure plate towards friction and clutch discs supported by the clutch outer member and clutch inner member, respectively.

2. Description of the Background Art

In a wet type multi-plate clutch apparatus for a power unit having an internal combustion engine, oil is raised by the rotation of a clutch outer member to thereby lubricate and cool the clutch apparatus. In general, the oil is stored in a lower portion of a power unit case in a rest condition of the internal combustion engine, and a lower portion of the clutch outer member is immersed in the oil thus stored in the lower portion of the power unit.

When the internal combustion engine is started to increase its rotational speed, the oil stored in the power unit case is fed to portions to be lubricated and cooled by an oil pump resulting into the oil level in the power unit case being lowered. Further, the oil is scattered toward the outer circumference of the clutch outer member by a centrifugal force due to the rotation of the clutch outer member thereby the amount of oil to be supplied to the clutch apparatus becomes insufficient. In order to cope with this problem, the oil atomized or splashed in the power unit case by the rotation of the clutch outer member is caught on the inner surface of a clutch cover, and thereafter is guided into the clutch apparatus.

A wet type multi-plate clutch apparatus for a power unit having an internal combustion engine mounted on a motorcycle or the like is shown in the Japanese Patent Laid-open No. Hei 10-274256 (FIGS. 2 and 3). The wet type multi-plate clutch apparatus according to the Japanese Patent Laid-open No. Hei 10-274256 includes a structure in which a pressure plate is formed with an oil-introducing hole for introducing the oil for lubrication and cooling into the clutch apparatus.

In the clutch apparatus shown in the Japanese Patent Laid-open No. Hei 10-274256, the pressure plate is formed with a plurality of deep recesses for respectively mounting a plurality of coil springs (clutch springs), and the oil-introducing hole is formed between the deep recesses. Further, a rib for guiding the oil is connected to a portion of the pressure plate having the oil-introducing hole, thereby guiding the oil raised by the clutch outer member into the clutch apparatus.

However, when the oil is introduced from the oil-introducing hole to the inside of the pressure plate in the clutch apparatus shown in the Japanese Patent Laid-open No. Hei 10-274256, the oil enters the deep recesses of the pressure plate and stays therein by the centrifugal force of the pressure plate. It is difficult to discharge this oil from the deep recesses.

The present invention has been made to overcome such drawbacks of the existing clutch apparatus. Accordingly, it is one of the objects of the present invention to provide a clutch apparatus which can easily discharge the oil from the deep recesses formed in the pressure plate to thereby improve the ability to lubricate and cool the friction discs and the clutch discs near the deep recesses.

SUMMARY OF THE INVENTION

In order to achieve the above objects, the present invention according to a first aspect thereof provides a clutch apparatus including a clutch outer member for supporting friction discs so that the friction discs are nonrotatable relative to the clutch outer member, and are axially slidable along a clutch axis; a clutch inner member for supporting clutch discs so that the clutch discs are nonrotatable relative to the clutch inner member, and are axially slidable along the clutch axis; and a pressure plate having a deep recess formed therein for accommodating a clutch spring engaged with the clutch inner member.

The deep recess according to the first aspect of the present invention generally includes a bottom portion having a spring seat for seating the clutch spring, and a wall portion having a partially cylindrical shape whose axis is parallel to the clutch axis. The wall portion has an inner surface oriented to the clutch axis. The deep recess is configured to accommodate the clutch spring inside the inner surface of the wall portion. The deep recess has a communicating portion formed therein for making the communication between the inner surface and an outer surface of the wall portion, and for discharging oil from the deep recess.

The present invention according to a second aspect thereof, in addition to the first aspect, is characterized in that the communicating portion extends from the bottom portion to the wall portion along the axis of the deep recess.

The present invention according to a third aspect thereof, in addition to one of the first and second aspects, is characterized in that the communicating portion is located on the advanced side of a straight line connecting the axis of the pressure plate and the axis of the deep recess with respect to a rotational direction of the pressure plate, as viewed along the axis of the pressure plate. Such straight line is perpendicular to the axis of said pressure plate and the axis of said deep recess.

The present invention according to a fourth aspect thereof, in addition to one of the first through third aspects, is characterized in that the communicating portion is located radially outwardly of a circle about the axis of the pressure plate, as viewed along the axis of the pressure plate, wherein the axis of the deep recess lies on the circle.

The present invention according to a fifth aspect thereof, in addition to one of the first through fourth aspects, is characterized in that the deep recess includes a plurality of deep recesses whose axes lie on a common circle about the axis of the pressure plate as viewed along the axis of the pressure plate.

The present invention according to a sixth aspect thereof, in addition to one of the first through fifth aspects, is characterized in that the inner surface of a clutch cover covering the outer side of the pressure plate is formed with a rib extending from the clutch axis toward the outer circumference of the clutch cover at its upper portion in an assembled state of the clutch apparatus, and the lower end of the rib projects into an opening formed at the center of the pressure plate.

EFFECTS OF THE INVENTION

According to the first aspect of the present invention the inner surface and the outer surface of the wall portion of the deep recess communicate with each other through the communicating portion. Accordingly, the oil flowing into the deep recess does not stay on the inner surface of the wall portion, but it is easily discharged from the communicating portion to the outer surface of the wall portion by the centrifugal force of the rotating pressure plate. As a result, the ability to lubricate and cool the friction discs and the clutch discs near the deep recess can be improved to thereby improve a disc sliding life.

According to the second aspect of the present invention, exhibiting the effect of the first aspect, the communicating portion can be formed together with the deep recess by casting out in manufacturing the pressure plate, so that any dedicated work for forming the communicating portion is not necessary, thereby reducing a manufacturing cost for the clutch apparatus.

According to the third aspect of the present invention, exhibiting the effect of one of the first and second aspects, the oil discharged from the communicating portion to the outer surface of the wall portion by the centrifugal force of the rotating pressure plate can be effectively directed to the friction discs and the clutch discs.

According to the fourth aspect of the present invention, exhibiting the effect of one of the first through third aspects, the oil discharged from the communicating portion to the outer surface of the wall portion by the centrifugal force of the rotating pressure plate can be more effectively directed towards the friction discs and the clutch discs.

According to the fifth aspect of the present invention, exhibiting the effect of one of the first through fourth aspects, the oil can be supplied to the friction discs and the clutch discs more uniformly.

According to the sixth aspect of the present invention, exhibiting the effect of one of the first through fifth aspects, the oil scattering inside of the clutch cover can be caught on the inner surface of the clutch cover and subsequently guided by the rib towards the lower end of the rib. The oil guided to the lower end of the rib can be supplied into the central opening of the pressure plate. Thus, the oil can be reliably supplied to the pressure plate.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
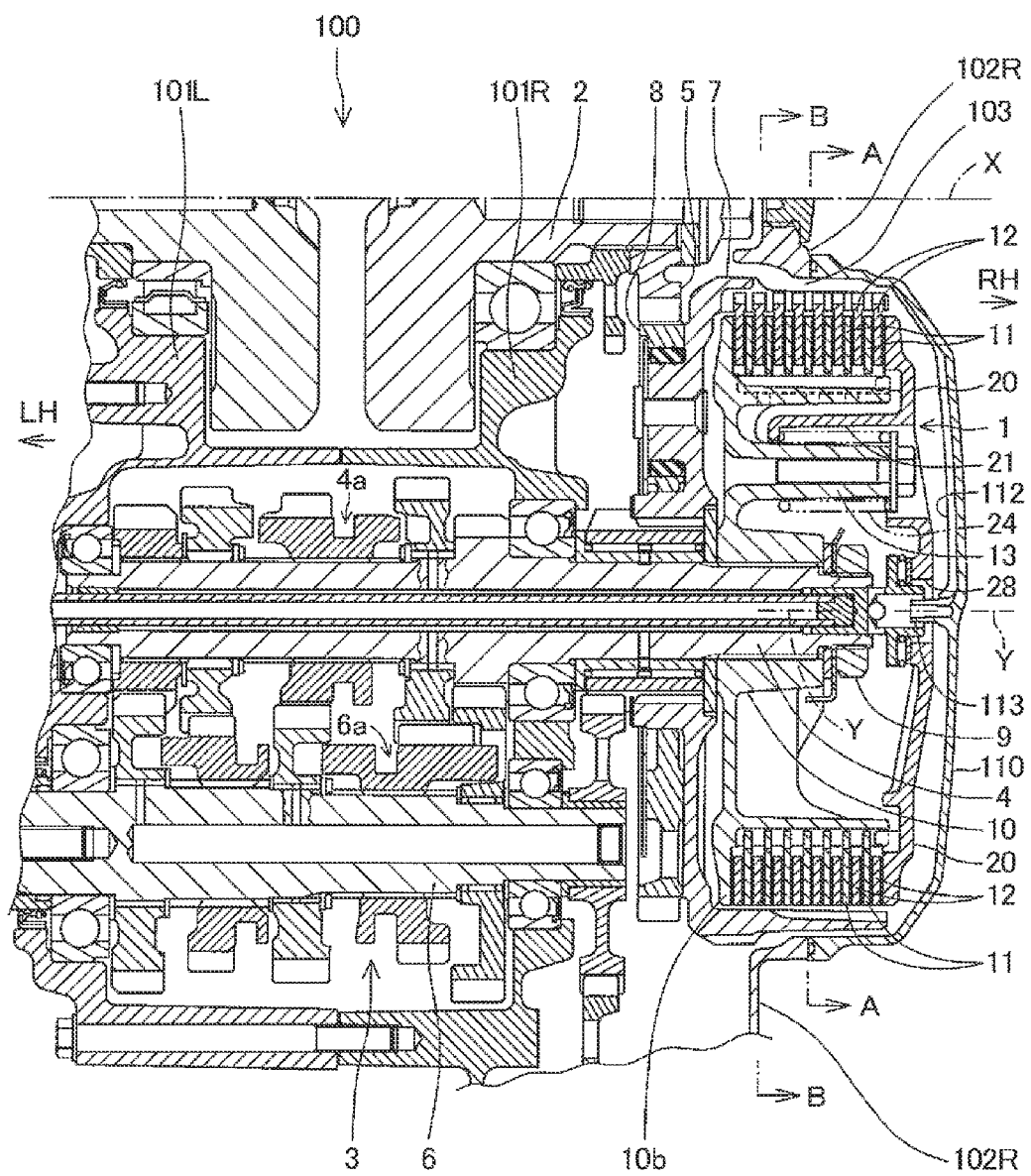
FIG. 1 is a sectional view showing a clutch apparatus according to an illustrative embodiment of the present invention and a part of a transmission unit adjacent to the clutch apparatus.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

A clutch apparatus 1 according to an illustrative embodiment of the present invention will now be described with reference to FIGS. 1 to 5.

The clutch apparatus 1 according to the illustrative embodiment is a wet type multi-plate clutch apparatus provided in a power unit 100 having an internal combustion engine mounted on a vehicle such as a motorcycle and a buggy. However, the vehicle and the power unit to which the present invention is applicable are not limited. For example, the present invention is applicable also to a stationary power unit. Further, the internal combustion engine constituting the power unit is not limited in kind, number of cylinders, etc.

In the drawings, the arrows of "LH," "RH," and "UP" respectively show the left side, right side, and upper side as viewed in a vehicle traveling direction in the condition where the power unit 100 is mounted on the vehicle. Further, the arrows affixed to various components, members, and parts schematically show the directions of flow of oil for lubrication and cooling.

FIG. 1 is a sectional view of the clutch apparatus 1 in the power unit 100 and a part of a transmission unit 3 adjacent to the clutch apparatus 1. The power unit 100 is mounted on a vehicle such that the axis X of a crankshaft 2 and the axis Y of a main shaft 4 extend parallel to each other in a substantially horizontal direction.

In the illustrative embodiment, the main shaft 4 extends in a lateral direction of the vehicle (horizontal direction as viewed in FIG. 1). However, the present invention is applicable also to a vehicle having a main shaft extending in a longitudinal direction of the vehicle, i.e., in a vehicle traveling direction.

As shown in FIG. 1, the power unit 100 (a part of which being shown) includes right and left power unit cases 101R and 101L, and the crankshaft 2 supported to the right and left power unit cases 101R and 101L. The transmission unit 3 is provided in the right and left power unit cases 101R and 101L. The clutch apparatus 1 is located on a torque transmitting path from the crankshaft 2 toward the main shaft 4 of the transmission unit 3. A primary drive gear 5 is provided on the crankshaft 2. The torque of the crankshaft 2 is transmitted through the clutch apparatus 1 to the main shaft 4 of the transmission unit 3.

A right power unit case cover 102R is mounted on the right power unit case 101R. The right power unit case cover 102R has an opening 103. The main shaft 4 projects rightward from the right power unit case 101R through the opening 103 of the right power unit case cover 102R. The clutch apparatus 1 is mounted on the main shaft 4 in the opening 103. The opening 103 is closed by a clutch cover 110 for covering the outer side of the clutch apparatus 1.

The clutch apparatus 1 is operated according to a shift operation by an operator. That is, during shifting of gears in the transmission unit 3, the clutch apparatus 1 does not transmit the torque of the crankshaft 2 to the main shaft 4 of the transmission unit 3, whereas when the gear shifting is finished, the clutch apparatus 1 transmits the torque of the crankshaft 2 to the main shaft 4.

The transmission unit 3 has the main shaft 4 and a counter shaft 6 both parallel to the crankshaft 2. Both of the main shaft 4 and the counter shaft 6 are supported to the right and left power unit cases 101R and 101L. Gears 4a are provided on the main shaft 4, and gears 6a are provided on the counter shaft 6. In gear shifting, these gears 4a and 6a are selectively operated and connected. The counter shaft 6 functions as an output shaft of the power unit 100.

The clutch apparatus 1 will now be described in more detail with reference to FIG. 2.

The clutch apparatus 1 includes a cylindrical clutch outer member 7 having a bottom portion. The clutch outer member 7 is rotatably supported to the main shaft 4 of the transmission unit 3. A primary driven gear 8 meshing with the primary drive gear 5 is mounted on the outer side (left side as viewed in FIG. 2) of the bottom portion of the clutch outer member 7. The primary drive gear 5 having a relatively small diameter and the primary driven gear 8 having a diameter larger than that of the primary drive gear 5 constitute a primary speed reducing apparatus.

Accordingly, the axis (clutch axis) of the clutch apparatus 1 is the same as the axis Y of the main shaft 4.

A cylindrical clutch inner member 10 having a bottom portion is provided inside the clutch outer member 7. The clutch inner member 10 is splined to the main shaft 4 and fixed thereto by a nut 9. The clutch inner member 10 has a peripheral wall portion 10a, and a plurality of clutch discs 11 are supported to the outer circumference of the peripheral wall portion 10a of the clutch inner member 10 so as to be relatively nonrotatable, and axially slidable along the clutch axis Y.

On the other hand, the clutch outer member 7 has a peripheral wall portion 7a, and a plurality of friction discs 12 are supported to the inner circumference of the peripheral wall portion 7a of the clutch outer member 7 so as to be relatively nonrotatable and axially slidable along the clutch axis Y. The friction discs 12 and the clutch discs 11 are alternately arranged in the axial direction along the clutch axis Y.

A pressure plate 20 is in abutment against the outermost friction disc 12 (rightmost one as viewed in FIG. 2) of the arrangement of the clutch discs 11 and the friction discs 12. On the other hand, the clutch inner member 10 has a pressure receiving portion 10b formed radially outside of the peripheral wall portion 10a, and the arrangement of the clutch discs 11 and the friction discs 12 is sandwiched by the pressure plate 20 and the pressure receiving portion 10b of the clutch inner member 10.

The clutch inner member 10 has an annular flat portion 10c formed between a central hub portion and the peripheral wall portion 10a. The annular flat portion 10c is formed with a plurality of projecting portions 13 (one of which being shown in FIGS. 1 and 2) projecting toward the pressure plate 20. Each projecting portion 13 has a central tapped hole 13a.

On the other hand, the pressure plate 20 is formed with a plurality of deep recesses 21 (one of which being shown in FIGS. 1 and 2) recessed toward the annular flat portion 10c of the clutch inner member 10 so as to respectively correspond to the plural projecting portions 13 of the clutch inner member 10. Each deep recess 21 has a bottom portion 22 formed with a through hole 23.

Each projecting portion 13 of the clutch inner member 10 is inserted through the through hole 23 of the corresponding deep recess 21 of the pressure plate 20 and projects into the corresponding deep recess 21. A bolt 14 is threadedly engaged with the tapped hole 13a of each projecting portion 13, and a washer 15 is fixed to the front end (right end as viewed in FIG. 2) of each projecting portion 13 by the bolt 14. The inner surface of the bottom portion 22 of each deep recess 21 of the pressure plate 20 functions as a spring seat 22a, and a clutch spring (coil spring) 24 is provided in a compressed condition between the washer 15 and the spring seat 22a.

Further, the peripheral wall portion 10a of the clutch inner member 10 is formed with a plurality of communication holes 16 for making the communication between the inner circumference and the outer circumference of the peripheral wall portion 10a.

The pressure plate 20 is normally biased inwardly (leftwardly as viewed in FIG. 2) by each clutch spring 24, so that the clutch discs 11 and the friction discs 12 are normally biased toward the pressure receiving portion 10b of the clutch inner member 10 by the pressure plate 20. Accordingly, the clutch apparatus 1 is normally engaged.

That is, the clutch discs 11 and the friction discs 12 are kept in frictional engagement with each other by the pressure applied from the pressure plate 20, so that the torque of the clutch outer member 7 is transmitted to the clutch inner member 10, and the main shaft 4 is therefore rotated with the clutch inner member 10 by the rotation thereof.

The main shaft 4 is formed with an axial hole 40 having the same axis as the axis Y. A clutch operating shaft 41 is inserted in the axial hole 40 of the main shaft 4. One end portion (right end portion as viewed in FIG. 2) of the axial hole 40 on the clutch apparatus 1 side is enlarged in diameter to form a large diameter portion 42 opening to the right end of the main shaft 4, and a pressure member 43 is axially slidably inserted in the large diameter portion 42.

The pressure member 43 is formed with an engaging hole 44 having the same axis as the axis Y in the condition where the pressure member 43 is inserted in the large diameter portion 42. The engaging hole 44 is formed on the side opposite to the clutch apparatus 1 side. One end portion (right end portion as viewed in FIG. 2) of the clutch operating shaft 41 is fitted in the engaging hole 44 of the pressure member 43. The other end portion (not shown) of the clutch operating shaft 41 is connected to a clutch operating mechanism (not shown).

The pressure member 43 has an outer end portion 43a opposite to the engaging hole 44. The outer end portion 43a is formed with an oil receiving hole 45 coaxial with the engaging hole 44. The oil receiving hole 45 opens to the outer end (right end as viewed in FIG. 2) of the pressure member 43. The oil receiving hole 45 has a bottom portion formed with a plurality of oil discharge holes 45a not communicating with the engaging hole 44, but opening to the side surface (cylindrical surface) of the pressure member 43.

Further, a flange 46 is formed on the outer side surface of the pressure member 43 at a position around the oil receiving hole 45 and adjacent to the oil discharge holes 45a.

In the assembled state of the clutch apparatus 1, the pressure plate 20 has an axis Y' substantially coinciding with the clutch axis Y, and has a central opening 28 as a through hole extending along the axis Y'.

The outer end portion 43a of the pressure member 43 is located in the central opening 28 of the pressure plate 20. The flange 46 of the pressure member 43 is in abutment against a central inner surface 28a of the pressure plate 20 around the central opening 28 through a bearing 47.

Figure 2:
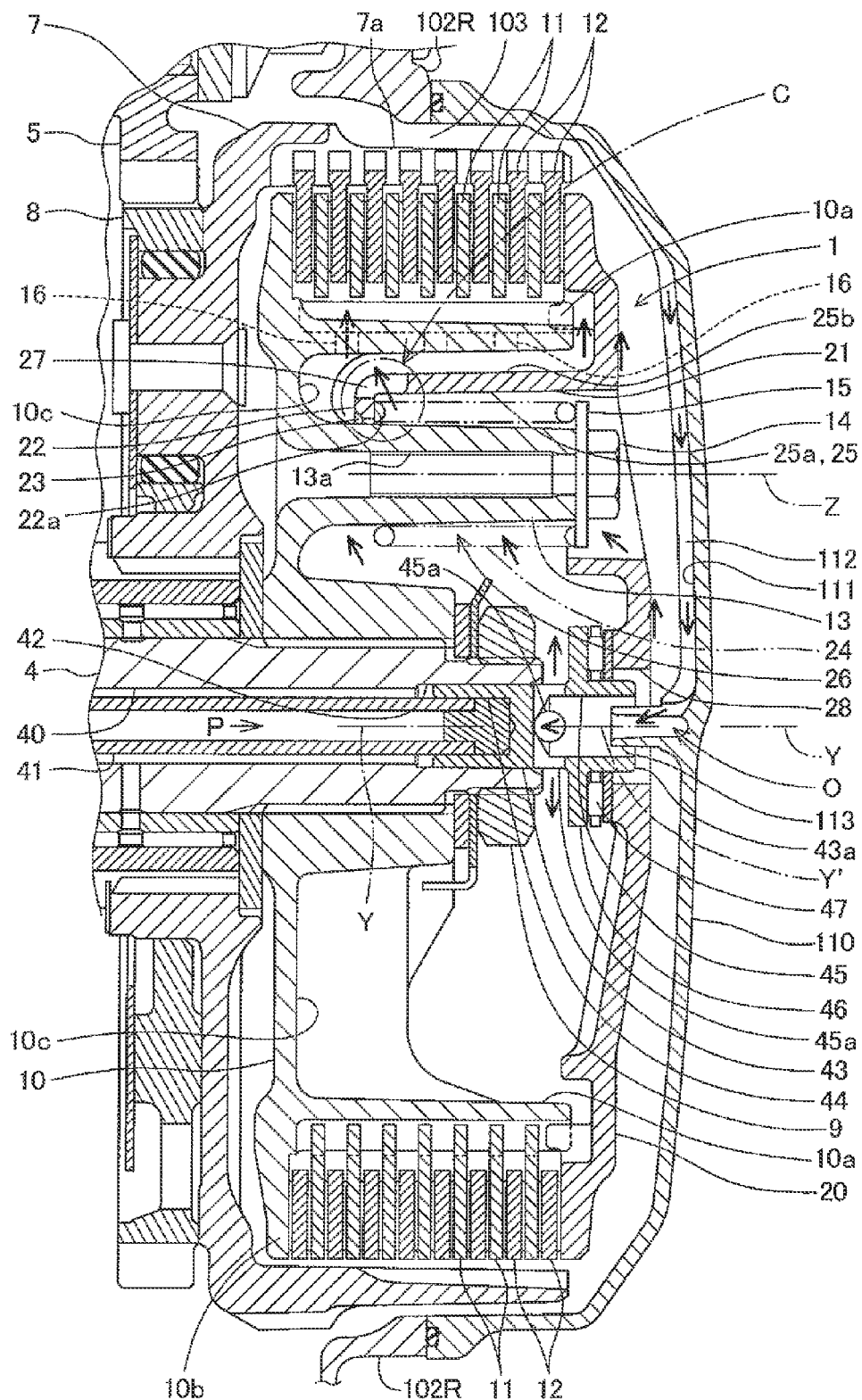
FIG. 2 is an enlarged sectional view of an essential part of the clutch apparatus, wherein a pressure plate shown in FIG. 2 corresponds to a cross section taken along the line D-D in FIG. 4 and only an encircled portion C shown in FIG. 2 corresponds to a cross section taken along the line E-E in FIG. 4.

When the clutch operating shaft 41 is pushed axially outward (in the direction shown by an arrow P in FIG. 2) by the clutch operating mechanism (not shown), the clutch operating shaft 41 operates to push the pressure plate 20 through the pressure member 43 and the bearing 47 in the axially outward direction of the clutch apparatus 1 (in the rightward direction along the axis Y as viewed in FIG. 2).

When the pressure plate 20 is moved in the axially outward direction against the biasing force of the clutch springs 24, the pressure applied from the pressure plate 20 to the clutch discs 11 and the friction discs 12 is reduced to cancel the frictional engagement between the clutch discs 11 and the friction discs 12. Accordingly, the torque of the clutch outer member 7 is not transmitted to the clutch inner member 10. That is, the clutch apparatus 1 is put in a disengaged state thereof.

When the operating force applied to the clutch operating shaft 41 by the clutch operating mechanism is removed, the pressure plate 20 is biased by the clutch springs 24 to push back the pressure member 43 and the clutch operating shaft 41 and move in the axially inward direction of the clutch apparatus 1 (in the leftward direction along the axis Y as viewed in FIG. 2). Accordingly, the pressure of the pressure plate 20 to the clutch discs 11 and the friction discs 12 is restored, so that the clutch apparatus 1 is put in an engaged state thereof.

Figure 3:
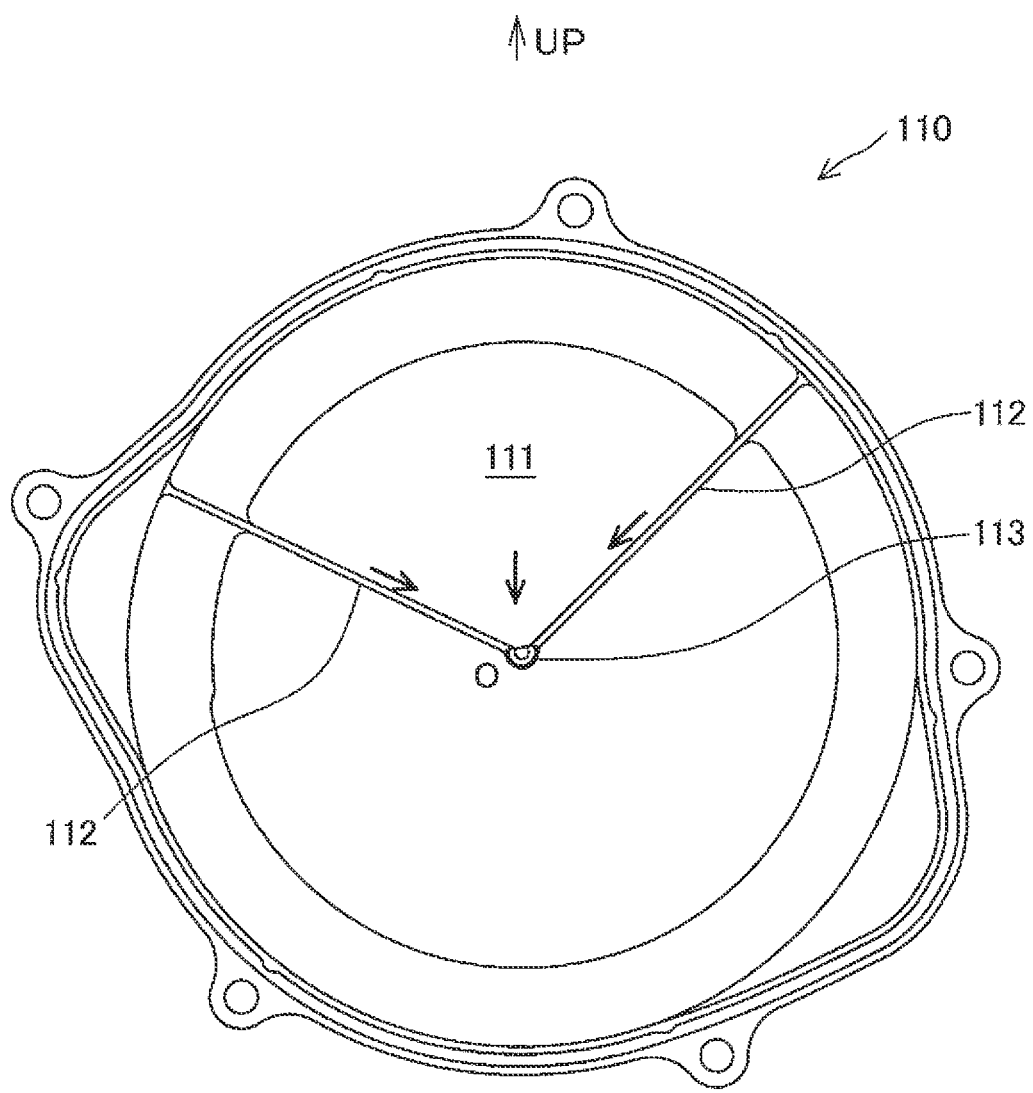
FIG. 3 is a view taken along the line A-A in FIG. 1, showing the inner surface of a clutch cover.

The clutch cover 110 is so mounted as to close the opening 103 of the right power unit case cover 102R and cover the outer side of the clutch apparatus 1. As best shown in FIG. 3, the clutch cover 110 has an inner surface 111 formed with ribs 112 extending from the center O of the clutch cover 110 toward the outer circumference at an upper portion of the clutch cover 110. The center O of the clutch cover 110 lies on the clutch axis Y.

The lower ends of the ribs 112 are joined at the center O of the clutch cover 110 to form a projecting portion 113 projecting toward the pressure plate 20. The projecting portion 113 has a semi-cylindrical shape opening upwardly.

As shown in FIG. 2, the projecting portion 113 is located in the central opening 28 of the pressure plate 20. Accordingly, the projecting portion 113 is inserted in the end opening of the oil receiving hole 45 formed in the outer end portion 43a of the pressure member 43 located in the central opening 28.

The pressure plate 20 will now be described in more detail with reference to FIGS. 4 and 5.

As discussed above, the pressure plate 20 has the plural deep recesses 21 for respectively accommodating the plural clutch springs 24 engaged with the clutch inner member 10.

Each deep recess 21 generally includes the bottom portion 22 having the spring seat 22a for seating the clutch spring 24 and a wall portion 25 having a partially cylindrical shape whose axis Z is parallel to the clutch axis Y. Each of the wall portions 25 of the deep recesses 21 has an inner surface 25a oriented to the clutch axis Y. Further, the wall portion 25 has a cutout 26 at a position opposed to the clutch axis Y.

Each deep recess 21 accommodates the corresponding clutch spring 24 inside the inner surface 25a of the wall portion 25, and has a communicating portion 27 for making the communication between the inner surface 25a and an outer surface 25b of the wall portion 25.

The communicating portion 27 has an axis W parallel to the axis Z of the wall portion 25, and extends from the bottom portion 22 to the wall portion 25 along the axis W. Accordingly, the communicating portion 27 can be formed together with each deep recess 21 by casting out in manufacturing the pressure plate 20.

In the assembled state of the clutch apparatus 1, the axis Y' of the pressure plate 20 substantially coincides with the axis Y of the main shaft 4, i.e., the clutch axis Y except a tolerance and a clearance in assembling.

The central portion of the pressure plate 20 is formed with the opening 28 having the same axis as the axis Y', and the inner side surface 28a around the opening 28 abuts against the pressure member 43 through the bearing 47.

Figure 4:
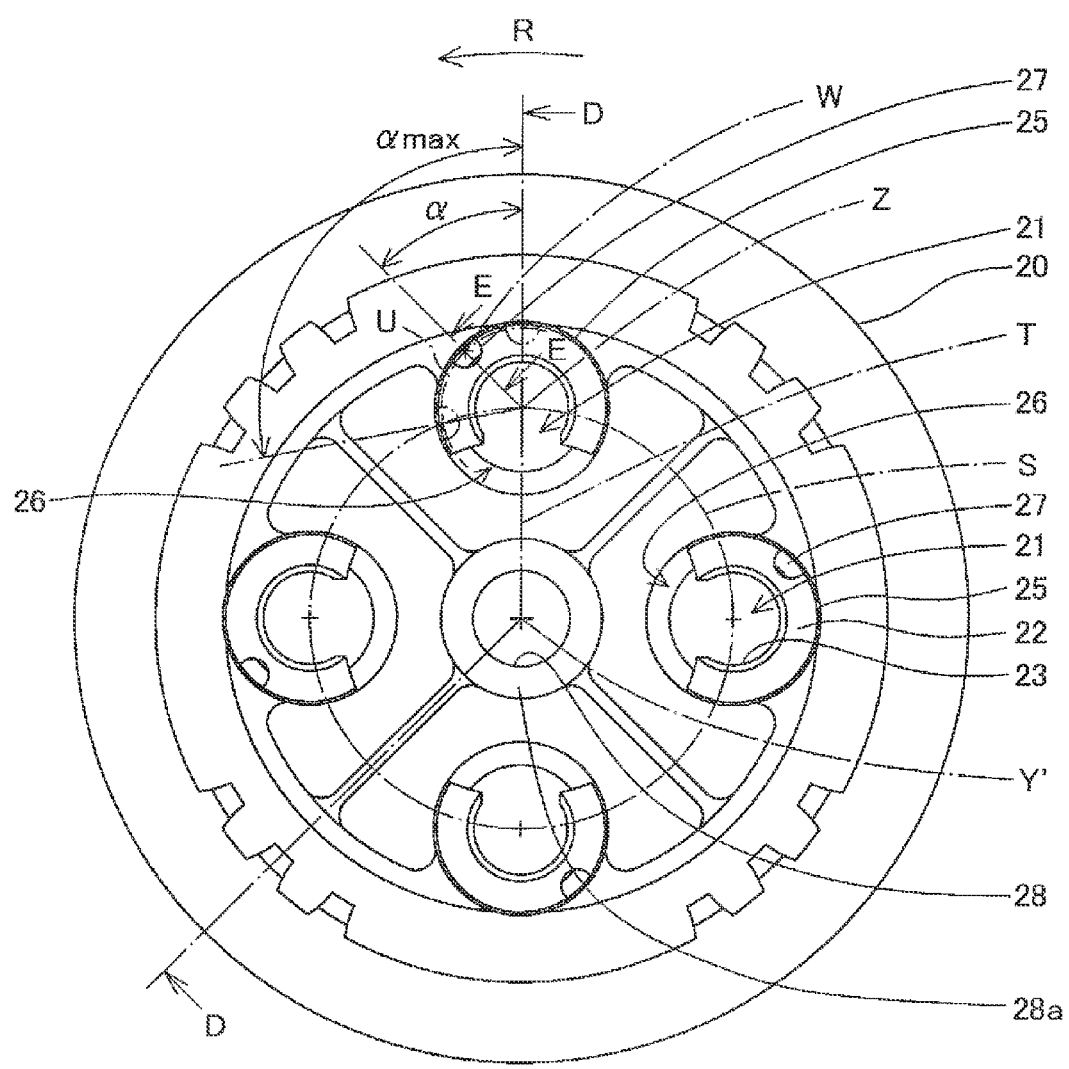
FIG. 4 is a view taken along the line B-B in FIG. 1, showing the inner surface of a pressure plate.

As shown in FIG. 4, the pressure plate 20 has the four deep recesses 21, and the axes Z of these four deep recesses 21 lie on a common circle S about the axis Y' of the pressure plate 20 as viewed along the axis Y'.

Further, the axis W of the communicating portion 27 in each deep recess 21 is located on the advanced side of a straight line T connecting the axis Y' of the pressure plate 20 and the axis Z of each deep recess 21 with respect to a rotational direction R of the pressure plate 20 as viewed along the axis Y'. The straight line is perpendicular to each of the axis Y' of the pressure plate 20 and the axis Z of each deep recess 21. An angle α formed between the straight line T and a straight line connecting the axis Z and the axis W is set to 45°).

Further, the axis W of the communicating portion 27 in each deep recess 21 is located radially outside of the circle S about the axis Y' of the pressure plate 20.

More specifically, the axis W of the communicating portion 27 is located radially outside of the circle S in an angular range between the intersections of the circle S and a phantom circle U about the axis Z on which the axis W lies (e.g., the axis W is located in an angular range αmax between the straight line T and a straight line connecting the axis Z and the intersection of the circle S and the phantom circle U on the advanced side of the straight line T with respect to the rotational direction R).

In the operation of the clutch apparatus 1, discussed above, the oil is raised by the rotation of the clutch outer member 7 at starting the internal combustion engine of the power unit 100. When the rotational speed of the internal combustion engine is increased, the oil is atomized or splashed by the rotation of the clutch outer member 7 and then caught by the inner surface 111 of the clutch cover 110. The oil is next guided particularly to the clutch discs 11 and the friction discs 12.

Referring to FIG. 2, the atomized or splashed oil is caught by the inner surface 111 of the clutch cover 110 and is next guided by the ribs 112 formed on the inner surface 111 so as to radially extend from the clutch axis Y toward the outer circumference of the clutch cover 110 at its upper portion. The oil guided by the ribs 112 is collected to the projecting portion 113 formed at the lower ends of the ribs 112 and is next supplied into the opening 28 formed at the central portion of the pressure plate 20 in which opening 28 the projecting portion 113 is located.

A part of the oil supplied into the opening 28 flows on the outer surface of the pressure plate 20 from the opening 28 in the radial direction by a centrifugal force of the rotating pressure plate 20. A part of this oil flowing on the outer surface of the pressure plate 20 is introduced into the deep recesses 21, and the remaining oil further flows toward the outer circumference of the pressure plate 20 to reach the clutch discs 11 and the friction discs 12.

The remaining oil supplied into the opening 28 is supplied into the oil receiving hole 45 of the pressure member 43 inserted in the opening 28 and is next discharged from the oil discharge holes 45a into the space defined between the pressure plate 20 and the clutch inner member 10 in the radial direction by a centrifugal force of the pressure member 43 rotating with the pressure plate 20.

The wall portion 25 of each deep recess 21 has the cutout 26 opening to the clutch axis Y. Accordingly, a part of the oil discharged from the oil discharge holes 45a in the radial direction is introduced from the cutout 26 into each deep recess 21, and the remaining oil does not flow into each deep recess 21, but reaches the inner circumference of the peripheral wall portion 10a of the clutch inner member 10.

The peripheral wall portion 10a has the plural communication holes 16 for making the communication between the inner circumference and the outer circumference of the peripheral wall portion 10a. Accordingly, a part of the oil flows through the communication holes 16 by a centrifugal force of the rotating peripheral wall portion 10a to reach the clutch discs 11 and the friction discs 12, and the remaining oil flows through the space between the front end (right end as viewed in FIG. 2) of the peripheral wall portion 10a and the inner surface of the pressure plate 20 to reach the clutch discs 11 and the friction discs 12.

A part of the wall portion 25 of each deep recess 21 has a cylindrical shape whose axis Z is parallel to the clutch axis Y, and the inner surface 25a of the wall portion 25 is oriented to the clutch axis Y. In the case of a conventional apparatus, the oil flowing into each deep recess 21 along any oil path is retained to stay on the inner surface 25a of the wall portion 25 by the centrifugal force of the pressure plate 20, so that there is a problem in that it is difficult discharge the oil from each deep recess 21. Accordingly, there is a possibility that the amount of oil to be supplied to the clutch discs 11 and the friction discs 12 near the deep recesses 21 may be reduced.

Figure 5:
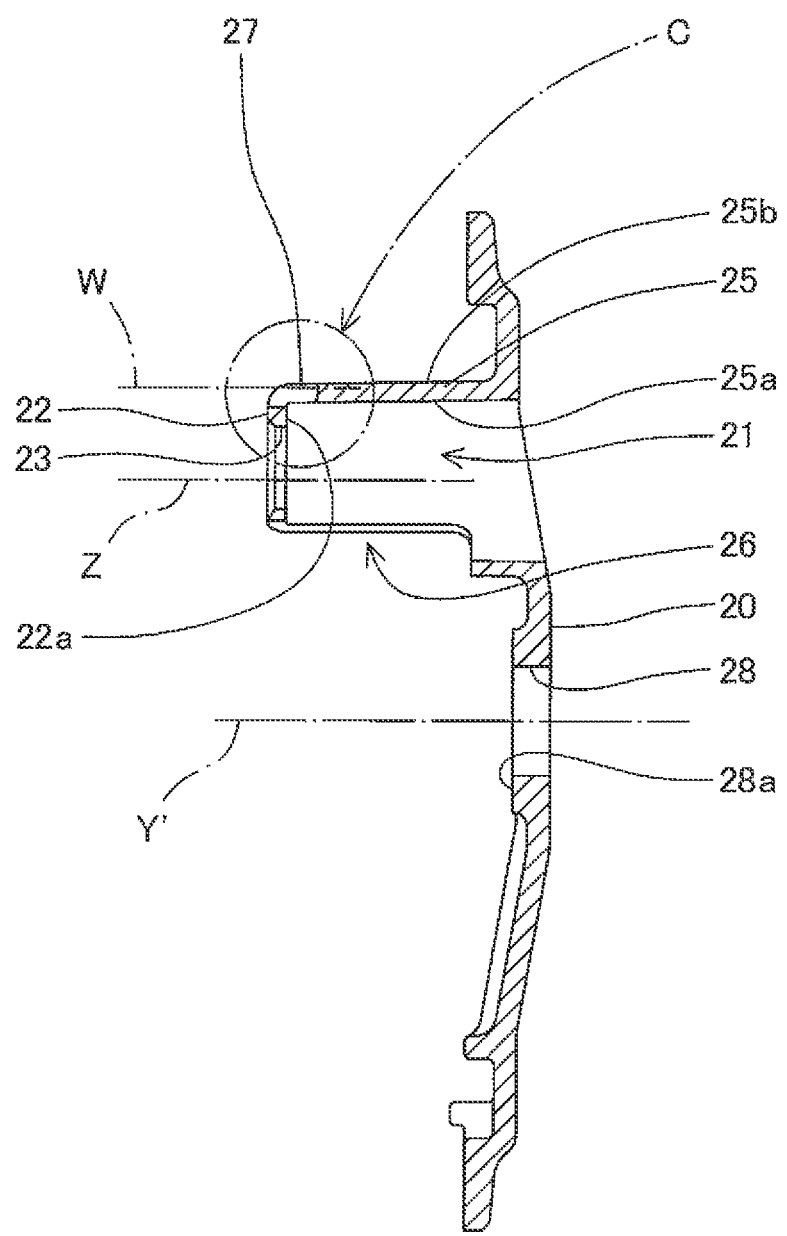
FIG. 5 is a vertical sectional view of the pressure plate as taken along the line D-D in FIG. 4, wherein only an encircled portion C in FIG. 5 corresponds to the cross section taken along the line E-E in FIG. 4.

In contrast, according to the illustrative embodiment, as described above, each deep recess 21 has the communicating portion 27 for making the communication between the inner surface 25a and the outer surface 25b of the wall portion 25 as shown in FIG. 2 (also shown in FIGS. 4 and 5). Accordingly, the oil flowing into each deep recess 21 does not stay on the inner surface 25a of the wall portion 25, but it is easily discharged from the communicating portion 27 to the outer surface 25b by the centrifugal force of the rotating pressure plate 20.

The oil discharged from the communicating portion 27 of each deep recess 21 is supplied to the clutch discs 11 and the friction discs 12 through the communication holes 16 of the peripheral wall portion 10a of the clutch inner member 10 or through the space between the front end of the peripheral wall portion 10a and the inner surface of the pressure plate 20, thereby lubricating and cooling these discs 11 and 12.

As a result, the ability to lubricate and cool the clutch discs 11 and the friction discs 12 near the deep recesses 21 can be improved to thereby improve a disc sliding life. Further, the ability to circulate the oil can be improved to thereby effectively use the oil.

Further, the communicating portion 27 is so formed as to extend from the bottom portion 22 to the wall portion 25 of each deep recess 21 in the axial direction along the axis Z of each deep recess 21. Accordingly, the communicating portion 27 can be formed together with each deep recess 21 by casting out in manufacturing the pressure plate 20, so that a dedicated work for forming the communicating portion 27 is not necessary, thereby reducing a manufacturing cost for the clutch apparatus 1.

Further, the communicating portion 27 is located on the advanced side of the straight line T connecting the axis Y' of the pressure plate 20 and the axis Z of each deep recess 21 with respect to the rotational direction R of the pressure plate 20 as viewed along the axis Y'. Accordingly, the oil discharged from the communicating portion 27 to the outer surface 25b by the centrifugal force of the rotating pressure plate 20 can be effectively directed to the friction discs 12 and the clutch discs 11 located radially outside of each deep recess 21 along the straight line T.

Further, the communicating portion 27 is located radially outside of the circle S about the axis Y' of the pressure plate 20 as viewed along the axis Y', wherein the axis Z of each deep recess 21 lies on the circle S. Accordingly, the communicating portion 27 of each deep recess 21 is located in such an angular range oriented from the clutch axis Y toward the outer circumference of the pressure plate 20. As a result, the oil discharged from the communicating portion 27 to the outer surface 25b by the centrifugal force of the rotating pressure plate 20 can be more effectively directed to the friction discs 12 and the clutch discs 11.

Further, the axes Z of the plural deep recesses 21 lie on the common circle S about the axis Y' of the pressure plate 20 as viewed along the axis Y'. Accordingly, the oil can be supplied to the friction discs 12 and the clutch discs 11 more uniformly.

Further, the inner surface 111 of the clutch cover 110 covering the outer side of the pressure plate 20 is formed with the ribs 112 extending from the clutch axis Y toward the outer circumference of the clutch cover 110 at its upper portion in the assembled condition of the clutch apparatus 1, and the projecting portion 113 formed at the lower ends of the ribs 112 projects into the opening 28 formed at the center O of the pressure plate 20.

Accordingly, the oil scattering inside of the clutch cover 110 can be caught on the inner surface 111 of the clutch cover 110 and next guided by the ribs 112 toward the projecting portion 113 formed at the lower ends of the ribs 112. The oil guided to the projecting portion 113 can be supplied into the central opening 28 of the pressure plate 20. Thus, the oil can be reliably supplied to the pressure plate 20.

While the illustrative embodiment of the present invention has been described herein, the present invention is not limited to this preferred embodiment, but various modifications may be made without departing from the scope of the present invention.

For example, as defined in fifth aspect of the present invention, the axes Z of the plural deep recesses 21 lie on the common circle S in this preferred embodiment. However, only one deep recess similar to each deep recess 21 may be formed on the pressure plate 20.

Further, the axes Z of the plural deep recesses 21 may not lie on the common circle S. Also in these cases, the inventions as defined in the first through fourth aspects of the present invention can be effectively carried out and can exhibit similar effects. Further, the invention as defined in the sixth aspect can also be effectively carried out and can exhibit similar effects. However, the invention as defined in the fifth aspect can be carried out more effectively to exhibit the effects mentioned above.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A clutch apparatus comprising:
a clutch outer member for supporting a plurality of friction discs thereon such that said friction discs are nonrotatable relative to said clutch outer member, and are axially slidable along a clutch axis;
a clutch inner member for supporting a plurality of clutch discs thereon such that said clutch discs are nonrotatable relative to said clutch inner member, and are axially slidable along said clutch axis;
a clutch spring engaged with said clutch inner member; and
a pressure plate having plurality of deep recesses formed therein for accommodating said clutch spring engaged with said clutch inner member;
wherein said deep recesses are positioned on a common circle about the axis of said pressure plate as viewed along the axis of said pressure plate, each of said deep recesses comprising:
a bottom portion having a spring seat for receiving said clutch spring,
and a wall portion including a partially cylindrical shape having an axis thereof arranged parallel to said clutch axis, wherein said wall portion includes an inner surface oriented towards said clutch axis, and an outer surface;
wherein said deep recess is configured to accommodate said clutch spring inside said inner surface of said wall portion;
and wherein each of said deep recesses has a communicating portion formed therein for providing communication between said inner surface and the outer surface of said wall portion;
and further including a clutch cover having inner surface covering the outer side of said pressure plate; said inner surface of the clutch cover being formed with multiple ribs;
wherein said pressure plate has a center opening formed at a center portion thereof, and in an assembled state of said clutch apparatus, said ribs formed on the inner surface of the clutch cover extend from said clutch axis toward an outer circumference of said clutch cover, and a lower end of each rib projects into the center opening of said pressure plate and guides oil through the center opening to the deep recesses.

2. The clutch apparatus according to claim 1, wherein said communicating portion is located on a straight line connecting the axis of said pressure plate and the axis of said deep recess with respect to a rotational direction of said pressure plate as viewed along the axis of said pressure plate; and wherein said straight line is perpendicular to the axis of said pressure plate and the axis of said deep recess.

3. The clutch apparatus according to claim 2, wherein said communicating portion is located radially outwardly of the common circle about the axis of said pressure plate as viewed along the axis of said pressure plate, wherein the axis of said deep recess lies on said circle.

4. The clutch apparatus according to claim 1, wherein said communicating portion is located radially outwardly of the common circle about the axis of said pressure plate as viewed along the axis of said pressure plate, wherein the axis of said deep recess lies on said circle.

5. A power unit comprising
an internal combustion engine comprising a crankshaft;
a transmission unit comprising a main shaft arranged parallel to the crankshaft;
a clutch apparatus operatively disposed between said crankshaft and said transmission unit;
said clutch apparatus comprising:
a clutch outer member for supporting friction discs such that said friction discs are nonrotatable relative to said clutch outer member, and are axially slidable along a clutch axis;
a clutch inner member for supporting clutch discs such that said clutch discs are nonrotatable relative to said clutch inner member, and are axially slidable along said clutch axis;
a clutch spring engaged with said clutch inner member; and
a pressure plate having a plurality of deep recesses formed therein for accommodating said clutch spring engaged with said clutch inner member;
wherein said deep recesses are positioned on a common circle about the axis of said pressure plate as viewed along the axis of said pressure plate, each of said deep recesses comprising:
a bottom portion having a spring seat for receiving said clutch spring, and
a wall portion including a partially cylindrical shape having an axis thereof arranged parallel to said clutch axis,
wherein said wall portion has an inner surface oriented to said clutch axis, and an outer surface;
wherein said deep recess is configured to accommodate said clutch spring inside said inner surface of said wall portion; and
wherein said deep recess has a communicating portion formed therein for discharging oil from said deep recess,
wherein said communicating portion extends from said bottom portion to said wall portion along the axis of the deep recess;
and further including a clutch cover having inner surface covering the outer side of said pressure plate, said inner surface of the clutch cover being formed with multiple ribs;
wherein said pressure plate has a center opening formed at a center portion thereof,
and in an assembled state of said clutch apparatus, said ribs formed on the inner surface of the clutch cover extend from said clutch axis toward an outer circumference of said clutch cover and a lower end of each rib projects into the center opening of said pressure plate and guides oil through the center opening to the deep recesses.

6. A power unit according to claim 5, wherein said communicating portion is oriented such that, during operation of said clutch apparatus, oil discharged from the communicating portion is directed towards the friction discs and the clutch discs.

7. A clutch apparatus comprising:
a clutch outer member for supporting a plurality of friction discs thereon such that said friction discs are nonrotatable relative to said clutch outer member, and are axially slidable along a clutch axis;
a clutch inner member for supporting a plurality of clutch discs thereon such that said clutch discs are nonrotatable relative to said clutch inner member, and are axially slidable along said clutch axis;
a clutch spring engaged with said clutch inner member; and
a pressure plate having plurality of deep recesses formed therein for accommodating said clutch spring engaged with said clutch inner member;
wherein said deep recesses are positioned on a common circle about the axis of said pressure plate as viewed along the axis of said pressure plate, each of said deep recesses comprising:

a bottom portion having a spring seat for receiving said clutch spring, and a wall portion including a partially cylindrical shape having an axis thereof arranged parallel to said clutch axis, wherein said wall portion includes an inner surface oriented towards said clutch axis, and an outer surface;

wherein said deep recess is configured to accommodate said clutch spring inside said inner surface of said wall portion;

wherein each of said deep recesses has a communicating portion formed therein for providing communication between said inner surface and the outer surface of said wall portion;

wherein said communicating portion extends from said bottom portion to said wall portion along the axis of the said deep recess, and oil flowing into each deep recess is discharged from the communicating portion to the outer surface by centrifugal force of a rotating pressure plate;

and further including a clutch cover having inner surface covering the outer side of said pressure plate, said inner surface of the clutch cover being formed with multiple ribs;

wherein said pressure plate has a center opening formed at a center portion thereof, and in an assembled state of said clutch apparatus, said ribs formed on the inner surface of the clutch cover extend from said clutch axis toward an outer circumference of said clutch cover, and a lower end of each rib projects into the center opening of said pressure plate forming a projecting portion projecting toward the pressure plate, and the ribs direct a portion of the oil from the center opening of the pressure plate to the outer surface of the pressure plate in a radial direction and into the deep recesses, and direct another portion of the oil to the outer circumference of the pressure plate to the clutch disks and friction disks.

* * * * *